US007878893B1

(12) United States Patent
Mayeroff

(10) Patent No.: US 7,878,893 B1
(45) Date of Patent: Feb. 1, 2011

(54) METHOD AND DEVICE FOR DELIVERING PLAY INCENTIVES AT A GAMING MACHINE

(76) Inventor: Jason Mayeroff, 17/214 SO, 6 Sukhumut Road, Bangkok (TH) 10110

( * ) Notice: Subject to any disclaimer, the term of this patent is extended or adjusted under 35 U.S.C. 154(b) by 729 days.

(21) Appl. No.: 11/977,308

(22) Filed: Oct. 24, 2007

Related U.S. Application Data

(63) Continuation-in-part of application No. 11/349,822, filed on Feb. 7, 2006.

(51) Int. Cl.
*A63F 13/00* (2006.01)
*A63F 9/00* (2006.01)
*A63F 9/24* (2006.01)

(52) U.S. Cl. ............................ 463/16; 463/20; 463/17; 463/18; 463/25; 463/10; 273/138.2; 273/139; 273/144 A; 273/144 B

(58) Field of Classification Search .................. 463/10, 463/16, 17, 25, 7, 18; 273/138.2, 138 A, 273/139
See application file for complete search history.

(56) References Cited

U.S. PATENT DOCUMENTS 3,825,255 A * 7/1974 Kennard et al. ............. 273/139
4,375,666 A * 3/1983 Buck et al. .................... 463/10
5,344,199 A * 9/1994 Carstens et al. ............... 463/17
6,007,426 A * 12/1999 Kelly et al. .................. 463/16
6,210,276 B1 * 4/2001 Mullins ....................... 463/27
6,899,626 B1 * 5/2005 Luciano et al. ............... 463/25
2003/0100362 A1 * 5/2003 Horniak et al. ............... 463/25
2004/0102233 A1 * 5/2004 Ostler ........................... 463/7
2005/0113165 A1 * 5/2005 Horniak et al. ............... 463/25
2007/0066386 A1 * 3/2007 Shields ........................ 463/25
2009/0186699 A9 * 7/2009 Kelly .......................... 463/42

* cited by examiner

*Primary Examiner*—Peter DungBa Vo
*Assistant Examiner*—Frank M Leiva
(74) *Attorney, Agent, or Firm*—Morishita Law Firm, LLC; Robert Ryan Morishita

(57) ABSTRACT

One or more gaming machines include an incentive supply storage, along with at least one play incentive dispenser to deliver play incentives to a player at a gaming machine. Play of each gaming machine includes definition of at least one incentive qualifying event, resulting in dispensing a play incentive to a player. Optionally, some of the play incentives have substantially nominal value and some of the play incentives have non-nominal value. Incentive qualifying events may be random or based on outcomes generated during play of a gaming machine. Optionally, a play incentive may be dispensed along with issuance of a prize awarded through a game of chance. A prize award may be indicated by or on the play incentive, which may be awarded along with the play incentive. Optionally, the play incentives may be concealed in a packaging.

13 Claims, 12 Drawing Sheets

METHOD AND DEVICE FOR DELIVERING PLAY INCENTIVES AT A GAMING MACHINE

RELATED APPLICATION DATA

This application is a continuation-in-part of U.S. patent application Ser. No. 11/349,822, entitled "Method and Device for Delivering Play Incentives at a Gaming Machine," filed Feb. 7, 2006 by Applicant herein.

FIELD OF THE INVENTION

The present invention relates to gaming machines. More specifically, the present invention relates to a method and device for delivering play incentives so as to entertain players and retain the player at a gaming machine.

BACKGROUND OF THE INVENTION

Slot machines and other randomized gaming systems are well known in the casino industry. There are many different types of such games, with a wide variety of basic game and bonus structures. All are played by gamblers attempting to win some sort of game award, whether monetary or in-kind.

The market for gaming machines is highly adaptive and competitive. It is well known that players are attracted to gaming machines offering different, interesting, exciting, and fun concepts and games. The design of gaming machines has been approached in many directions, including offering new primary games, new secondary games, and new prizes. However, there has been little or no game design directed to entertaining the player by delivering physical incentives with nominal value that entice and encourage a player to continue play.

U.S. Pat. No. 6,899,626, discloses a machine designed to award a player a luxury item such as a diamond for selected bonus results. Other patents disclose machines and methods for delivering automobiles, show tickets, jewelry, even ice cream. Each of these prior art devices, however, places the value of the award in the award itself. In other words, the game award, such as the diamond, or the representation thereof, such as a voucher for an automobile or show ticket, has a value representing the game award and is the prize for which the player is playing.

Additionally, it is desirable to retain a player at a gaming machine. However, these types of prize awards often require the player to leave the gaming machine. In many cases, the player receives a voucher for an award. This requires the player to terminate his or her play and physically leave the gaming machine to redeem the voucher and receive his or her award. In other cases, the gaming machine issues an award that cannot be used at the gaming machine, but has a great intrinsic value, such as a diamond. The player in that case would either need to hold and protect such an award or, again, leave the gaming machine to place the award in a safe place. For example, a player may win a diamond ring, but once the ring is received, it is up to the player to keep it safe. Consequently, a player will often leave the gaming machine to take the diamond ring to the player's hotel room or to the hotel safe. The drawbacks to these types of machines, then, is that they do not retain a player at a gaming machine and, in fact, encourage a player to interrupt play and leave the gaming machine.

Thus, it can be seen that there is a need in the industry for gaming machines which entertain and occupy the interest of a player, thereby enticing the player to gamble more, and for longer periods of time.

SUMMARY OF THE INVENTION

The device of the present invention is a gaming machine that dispenses play incentives, at least some of which have substantially nominal value, and optionally at least some of which may non-nominal value. In one optional embodiment, play incentives may be food, such as a snack item, or a beverage, dispensed as a play incentive or as a vehicle to deliver a player award. For example, food may be in the form of popcorn, pieces of chocolate, jelly beans, nuts or leguminous treats, hard or soft candies, cookies, crackers, or even sausages. Optionally, a player receiving such a play incentive may enter a selection of color, flavor, type, or the like. In an alternate embodiment in which a beverage is offered, a player may be dispensed a beverage such as coffee or a soft drink, or even beer, wine, or a cocktail, again directly from the gaming machine itself. In an optional embodiment for operating a system of gaming machines according to the present invention, a gaming machine may be branded by a sponsor and the play incentives may be provided by the sponsor.

The play incentive is awarded at or after the occurrence of an incentive qualifying event. The incentive qualifying event could be random or may be based on the conduct of play at the gaming machine. For example, in one optional embodiment, the play incentive is presented based upon game outcome; in another it is awarded randomly or otherwise independent of game outcome. In one optional embodiment, the play incentive is awarded for its own sake, and is neither related to, nor representative of, any other prize of value in the game conducted at the gaming machine. In such an embodiment, the nominal value of the play incentive may not be incorporated into the mathematics of the overall gaming machine game. Thus, the overall payback percentage of the gaming machine is greater than the base payback percentage of the game of chance. In another optional embodiment, the play incentive accompanies a prize award awarded in the game, although the play incentive itself may have only nominal value. In yet another optional embodiment, the play incentive provides the medium for the awarding of the award value. For example, the play incentive may be in the form of jelly beans imprinted with a legend indicating the number of credits won, or chocolate bars may be wrapped within a voucher ticket, which may be redeemed, or fed back through the machines scrip or voucher reader.

In a device according to the present invention, an incentive supply storage is associated with one or more gaming machines. The incentive supply storage may be at a single gaming machine, and contain play incentives for a single gaming machine. Alternatively, an incentive supply storage may be shared by multiple gaming machines. In either case, such gaming machine, or gaming machines, may optionally be in communication with the incentive supply storage. Upon determination at the gaming machine that a play incentive is to be awarded, a request may be made of the incentive supply storage to dispense a play incentive. In an optional embodiment in which the value associated with such play incentive is not a factor in the mathematics of the individual gaming machine, neither the type for the value of the dispensed play incentive need be communicated back to the individual gaming machine at which the play incentive is to be dispensed.

Optionally, the incentive supply storage may be transparent to the player. For example, the gaming machine may include a large transparent container containing the play incentives to be delivered. In another optional embodiment, the incentive supply storage is translucent or opaque to the player. An incentive dispenser is in communication with the gaming machine's data processor. The incentive dispenser delivers incentives from the incentive supply storage to a player at the gaming machine under the direction of the data processor.

In a further optional embodiment, the play incentives may form a part of the game play. For example, in an optional embodiment, an incentive supply storage communicates with a display chamber displaying a quantity of play incentives to the player in response to the triggering of an incentive game. The triggering of the incentive game may be tied to an outcome in the game of chance or may be independent of the game of chance.

Input is received from the player representing the player's estimate of the quantity of play incentives displayed at the display chamber. The input from the player is compared to the quantity of play incentives displayed. If the input from the player is within a predetermined range of the quantity of play incentives displayed, a prize award is issued to the player. In an optional embodiment, at least a portion of the play incentives are dispensed to a player at the gaming machine without regard to whether the player's input is within the predetermined range.

In an optional embodiment, at least some of the play incentives may optionally be packaged in a container that is opaque, translucent, or transparent. In an optional embodiment, the container conceals at least a portion of the play incentive.

Likewise, where the incentive supply storage is shared by a plurality of gaming machines, a dispensing mechanism may transfer a play incentive from the incentive supply storage to the gaming machine at which the play incentive is to be awarded. Such transporting may employ open or transparent connecting channels, and may therefore optionally utilize at least partially opaque or translucent packaging to conceal the identity of at least some play incentives until awarded, delivered, dispensed, and opened by, or on behalf of, the recipient player.

In an optional embodiment, at least one of said play incentives has a non-nominal value. In one such optional embodiment, the play incentive with non-nominal value includes indicia representing said non-nominal value. For example, in one optional embodiment, the indicia may be a ticket or voucher exchangeable for cash, gaming credits, or the like, gift certificates, or other indicia of value. In an optional embodiment, the indicia may be concealed from the player such as in a container or packaging. In one such optional embodiment, the play incentive of non-nominal value may be a card, such as a scratch card, pull-tab card, or other mystery card with the indicia concealed from the player. In another such optional embodiment, the play incentive represents a tangible object of non-nominal value.

In use, a player will play a gaming machine implementing the disclosed method. When an incentive qualifying event occurs, a play incentive is delivered to the player. For example, in one optional embodiment, the incentive qualifying event is independent of the play at the gaming machine and the outcomes produced thereat. In another optional embodiment, the game of chance produces an outcome and the incentive qualifying event is based upon the outcome. While the relative value of the outcome and the play incentive could vary, in one optional embodiment, the outcome is associated with a prize award and the play incentive has a value substantially smaller than the prize award. In such an optional embodiment, the gaming machine may issue the prize award substantially contemporaneous with the incentive dispenser dispensing the play incentive to said player. Optionally, the play incentive may includes indicia thereon, such as printing directly on the play incentive or a wrapping around the play incentive, indicating the prize award. Where such prize awards are considered in the mathematics of the gaming machine, either communication from the gaming machine to the incentive supply storage directing the value of the prize award to be disposed, or communication from the incentive supply storage to the gaming machine indicating the value of the prize award to be dispensed, may optionally be implemented.

In one optional embodiment, the gaming machine includes an input device, and a player who is eligible for a play incentive may be asked to select a play incentive from the incentive supply storage. For example, the player may be asked to enter a selection, such as the color, shape, flavor, or the like, of an edible play incentive. In one optional embodiment, the play of the game at the gaming machine may be influenced by the player's selection. For example, in one optional embodiment, the player may be asked to pick the color of jelly bean desired, which color would be associated with a prize award. The player would receive one or more jelly beans of the selected color, as well as the prize award associated with the selected color. Such association between player selection and prize award may optionally be random and subject to revision on a predefined or random basis.

The play incentive is dispensed to the player at the gaming machine, without the need to redeem or exchange a representation of the play incentive at a location remote from the gaming machine.

DESCRIPTION

Figure 1:
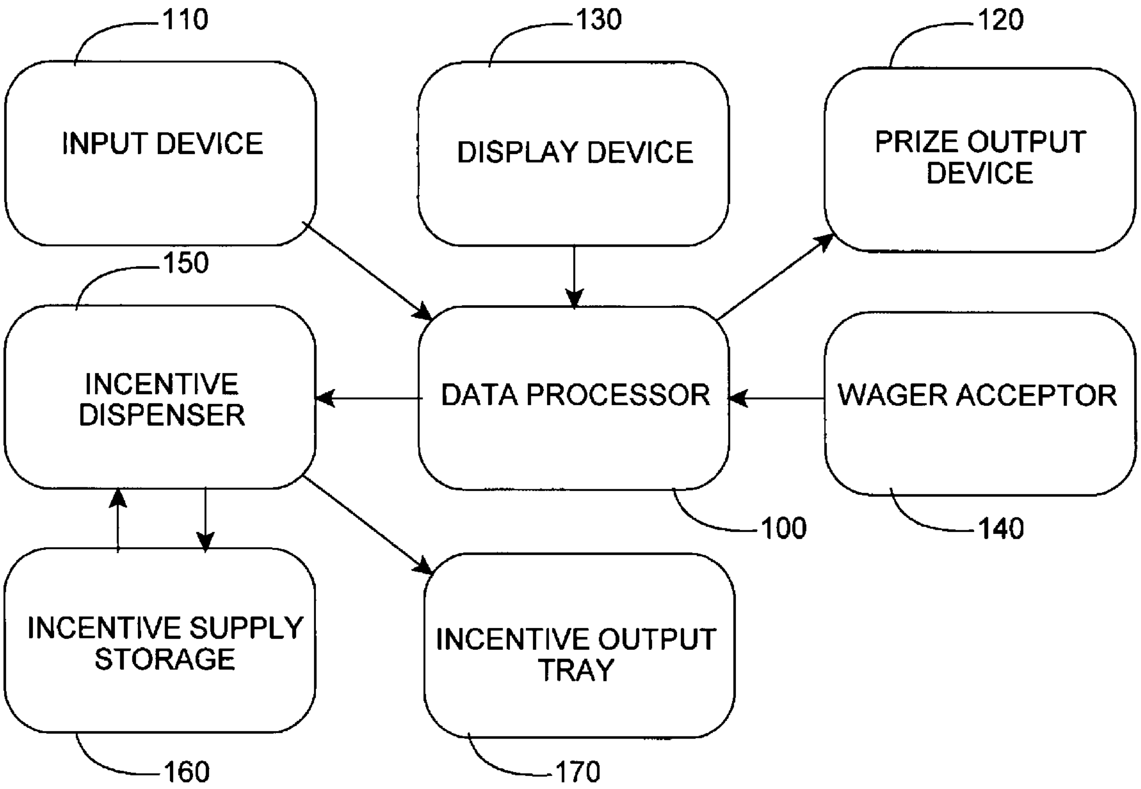
FIG. 1 is a block diagram of a device according to the present invention.
Figure 8:
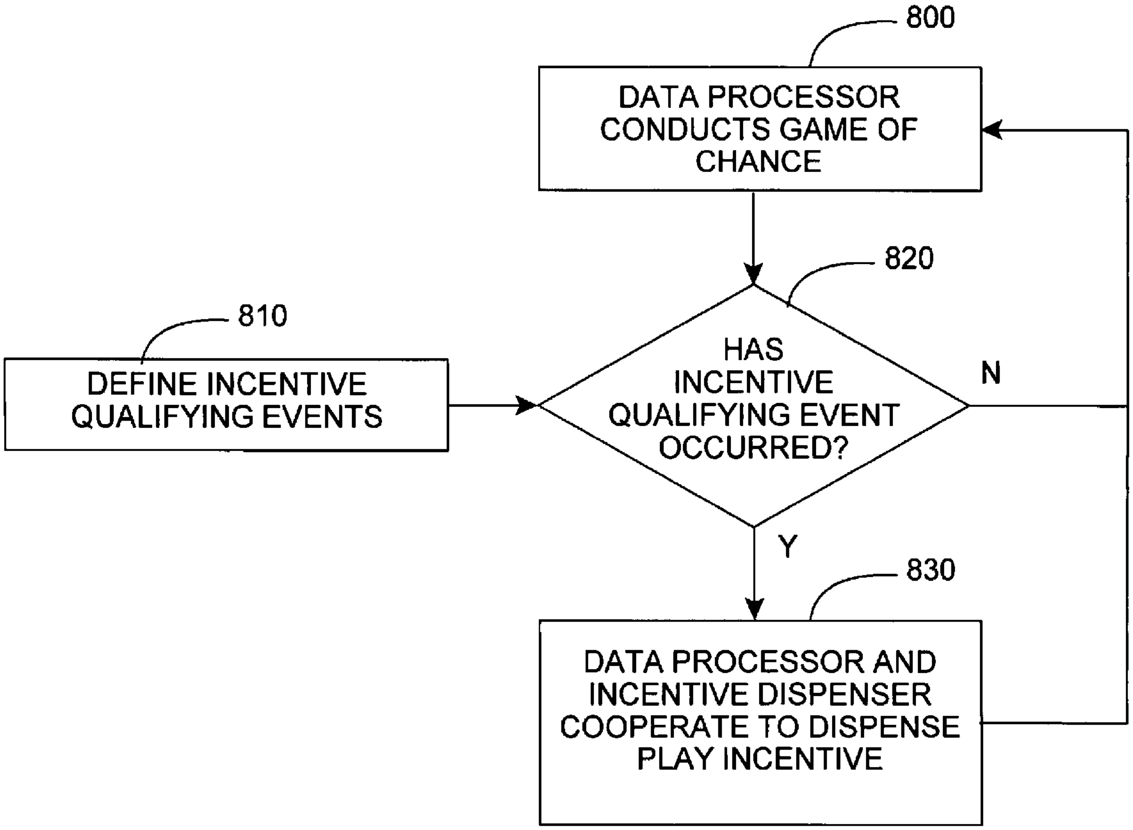
FIG. 8 is a flowchart of a method according to an embodiment of the present invention.

Reference is now made to the figures wherein like parts are referred to by like numerals throughout. Referring to FIGS. 1 and 8, the present invention is a method and device for awarding play incentives at a gaming machine. The method disclosed herein is applied to a gaming machine. The gaming machine may take any form and may conduct any type of game. For example, in one embodiment, the gaming machine may be a slot machine, whether a stepper machine or a video or electronic simulation thereof. In another embodiment, such a gaming machine may be a video poker machine. In yet another embodiment, the method disclosed herein may be implemented on a base gaming machine which plays Blackjack, Pai Gow, Keno, or any of the other games which have been implemented on a mechanical or electronic base.

The gaming machine includes a data processor 100 to control the play of the game. In the optional embodiment shown, the data processor 100 may also control the activation and dispensing of prizes and play incentives as disclosed herein, although it is likewise contemplated that separate processors may be used for game functions and prize and play incentive operations.

In an optional embodiment, the data processor 100 normally interacts with a wager acceptor 140 through which a player may deposit funds to be wagered. The wager acceptor 140 could take many different forms, including an acceptor receiving bills, coin, vouchers, credit or debit cards, smart cards, or any other means for indicating the transfer of a wager. Optionally, when a wager has been accepted through the wager acceptor 140, a signal is transmitted to the data processor 100 to acknowledge receipt of the wager and the wager size.

The game itself may require the entry of game play options, such as number of wager units to risk, number of pay lines to activate for a slot machine, cards to retain for a video poker game, or the like are inputted by the player. In such a game, an input device 110, such as a button panel, touchscreen, controller, pointer, or the like, communicating with the data processor 100 may be provided for the player to communicate his or her choices. It is noted that in other embodiments, the player may have no game choices and an input device may not be provided.

The gaming machine may also include a display device 130 controlled by the data processor 100. The display device 130 could take any form.

The gaming machine may include an prize output device 120 to dispense stored credits, prizes, winnings, or other reward payments earned through pay of the game. For example, when the player opts to cease play, or at any other time the player wishes to withdraw available wagering credits, the prize output device 120 may be utilized to allow the player to "cash out." The prize output device 120 could take any form, such as a coin or bill dispenser, voucher printer, electronic funds or credit transfer device, or the like.

In an optional embodiment in which the player has selections and other information input requirements during the play of the game, an input device 110 interacts with the data processor 100. In one optional embodiment, the input device 110 allows the player to select wagers to be placed, options to be selected, initiate and terminate play, and otherwise involve himself or herself in the game being played. In one optional embodiment, such input device 110 may consist of a touch screen which screen also functions as the display device 130. In an alternate optional embodiment, such option input device 110 may consist of button controls mounted to the game cabinet (not shown). In another alternative optional embodiment, such option input device 110 may be a remote control device, a keypad, or the like.

The game includes one or more incentive qualifying events. In the optional embodiment illustrated such incentive qualifying event may relate to a game result or may be a randomly triggered occurrence. For example, in one optional embodiment, an event occurring during the course of the game could trigger a bonus or secondary game or prize award, and may simultaneously be an incentive qualifying event. In another optional embodiment, an incentive qualifying event may be based on game play, such as the length of time or amount of money wagered or lost or won during a game play session. In yet another optional embodiment, an incentive qualifying event may be random in whole or in part.

Figure 9:
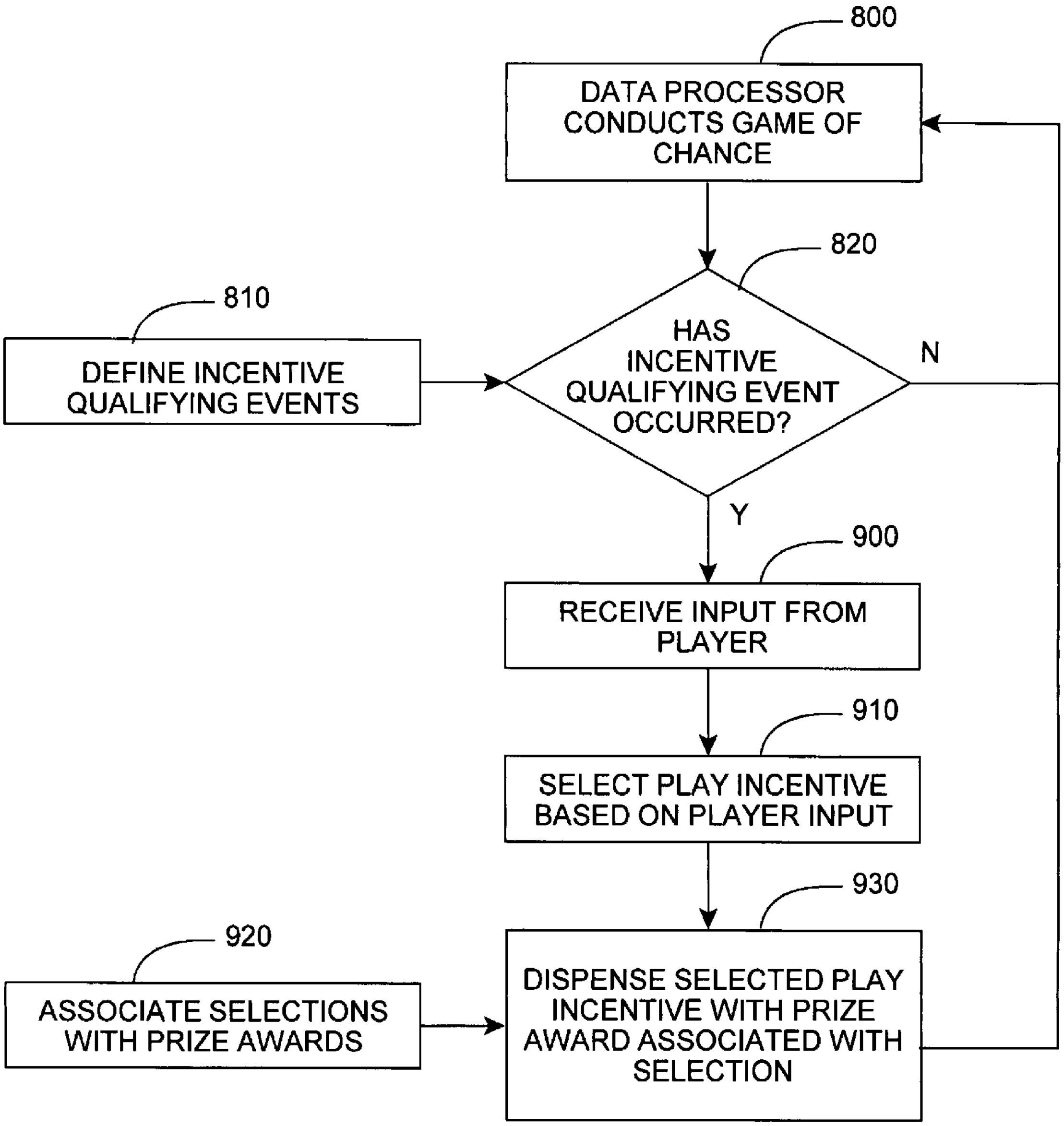
FIG. 9 is a flowchart of a method according to an embodiment of the present invention.

Referring generally to FIGS. 1, 8, and 9, the gaming machine conducts 800 the underlying game. Using the defined 810 incentive qualifying events, the gaming machine determines whether an incentive qualifying event has occurred 820. Upon the occurrence 820 of an incentive qualifying event, the gaming machine, optionally through the data processor 100, communicates with the incentive dispenser 150 to deliver 830 a play incentive from the incentive supply storage 160.

In an optional embodiment, at least a portion of the individual play incentives have substantially nominal value, but are designed to entertain the player and make them want to continue play. For example, in one optional embodiment, the play incentive is edible, such as candy in the form of chocolate bars, jelly beans, or the like. It is noted, however, that the play incentive could take any form, including popcorn, peanuts, gumballs, cookies, or any other consumable. In another optional embodiment, small prizes may be issued, such as toys, paper stickers, or other objects of substantially nominal value similar to those known informally as Cracker Jack® prizes. In yet another embodiment, beverages such as coffee, soft drinks, beer, wine, or cocktails may be dispensed to the player at the gaming machine. In such an optional embodiment, the play incentives could be pre-packaged in cans, bottles, tubes, or other containers. Alternatively, the incentive supply storage 160 could comprise a fluid storage, such as a tank or reservoir, and the incentive dispenser 150 could include a nozzle that delivers the play incentive to a cup or other container.

In an optional embodiment, play incentives having nominal value may be intermingled in the incentive supply storage 160 with play incentives having non-nominal value. Thus, in one such example, the incentive supply storage 160 may be filled with a randomized mixture of play incentives of nominal value, such as gumballs, toys, soft drinks, and chocolate bars, and play incentives of non-nominal value such as scratch cards, vouchers for cash or gaming credits, or tangible objects of value. In such an optional embodiment, while the proportional share of incentives of each type may be known in theory, in practice as play incentives are dispensed, and the incentive supply storage 160 is refilled, the relative quantity of each type of play incentive, and therefore the probability of a play incentive of any given type being dispensed, may continually vary. In one such optional embodiment, the value of a non-nominal value play incentive is represented by an indicia on the play incentive. For example, the indicia may be an image or text on a voucher, coupon, card, or the like, that represents the value. In a further optional embodiment, the indicia is concealed from the player such as underneath a removable or tearable tab on a card such as a scratch card, pull-tab card, or the like. In yet another optional embodiment, the indicia is a complete mystery to the player, such as a code or cipher that is visible to the player but does not outwardly reveal the value, until the play incentive is redeemed.

In a method of operating gaming machines according to the present invention, the gaming machines may be branded by the sponsor and at least a portion of the play incentives may be provided by a sponsor for promotional value. Thus, a candy manufacturer may have the manufacturer's name associated with the gaming machines and may supply play incentives in the form of candy.

It is noted that the incentive dispenser 150 is located at the gaming machine on which the player plays. That is, while the incentive supply storage 160 may be local or remote, or unique to the gaming machine or shared among many gaming machines, the incentive dispenser 150 is not remote from the player so that the player can continue playing at the gaming machine when the play incentives are dispensed without the need to cease play or defer the collection of the play incentive. Rather, the play incentive is dispensed directly to the player while playing, utilizing a local incentive dispenser 150. In the optional embodiment illustrated, the incentive dispenser 150 causes the play incentive to be removed from the incentive supply storage 160 and delivered to a player. Optionally, the incentive dispenser 150 includes a metering device to draw the desired play incentive, or quantity of play incentive, from the incentive supply storage 160, and a transport, such as a tube, belt, carrier, chute, or the like, to deliver the metered play incentive to the player. In an embodiment in which the play incentive consists of separate units dispensed together, such as a quantity of jelly beans or the like, the incentive dispenser 150 may deliver the play incentive to an incentive output tray 170 where it is accessible to the player.

The incentive supply storage 160 may be internal to the gaming machine or group of gaming machines, or may be visible to the player. For example, in one optional embodiment, the incentive supply storage 160 may be a transparent inverted bowl at the gaming cabinet, through which the play incentives are visible to the player.

Figure 10:
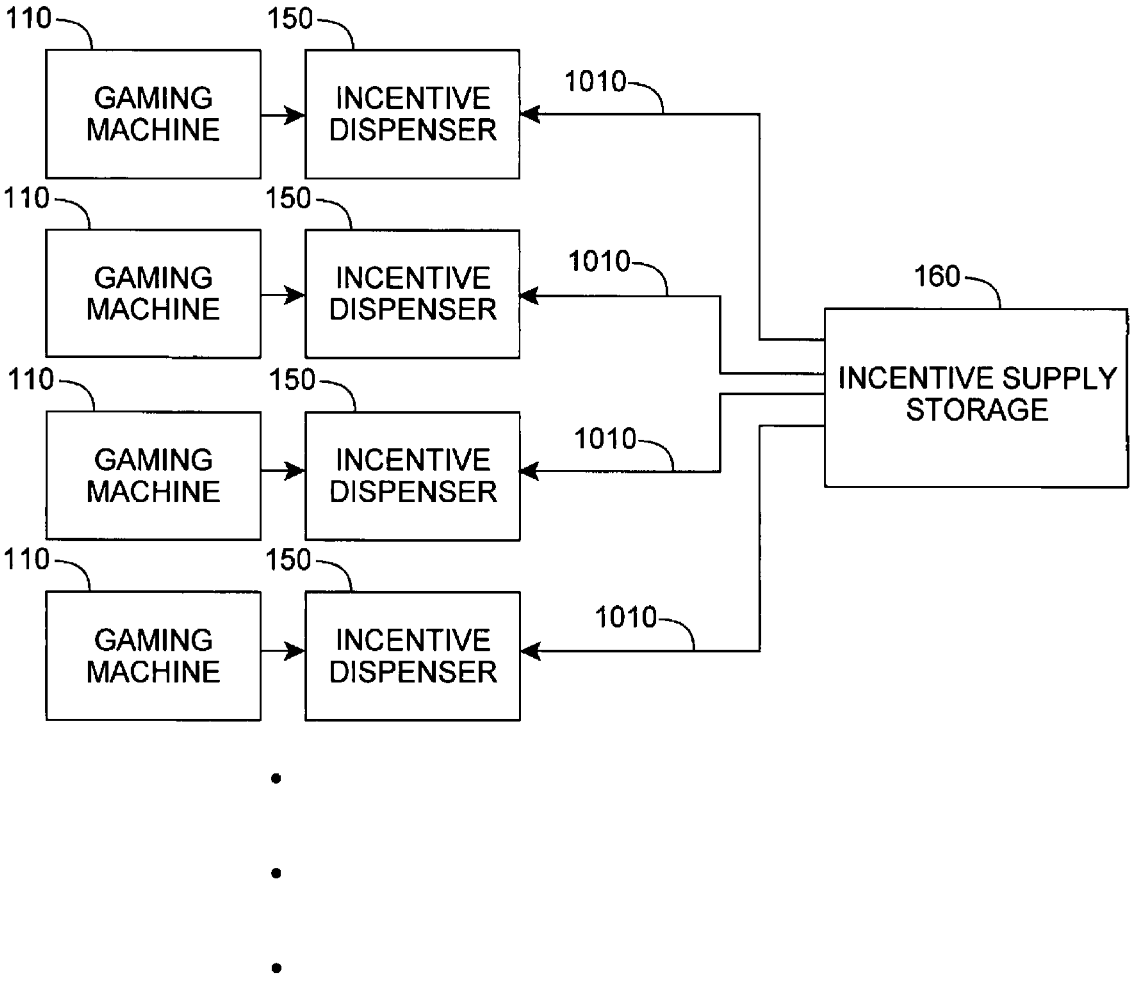
FIG. 10 is a block diagram of a plurality of gaming machines utilizing a single incentive supply storage.

As noted above, the incentive supply storage 160 may be shared among several gaming machines or may be used by only one gaming machine. One such optional embodiment in which the incentive supply storage 160 is shared among multiple gaming machines is shown in FIG. 10.

Optionally, the incentive supply storage 160 may be transparent to the player so that players may view the play incentives or containers containing the play incentives available. In an optional embodiment in which multiple gaming machines share an incentive supply storage, the incentive supply storage is optionally visible from all gaming machines sharing the incentive supply storage. Play incentives to be dispensed may be delivered to an incentive dispenser 150 by communications channels 1010, optionally transparent. In alternate optional embodiments, the incentive supply storage 160 and/or communications channels 1010 may be opaque, translucent, or positioned outside the players' view.

In an optional embodiment, at least a subset of such play incentives may be individually packaged in a container. Such packaging may optionally be transparent, translucent, or opaque, or a combination thereof. Optionally, at least a portion of the play incentive contained within the packaging or container is concealed or obscured by the packaging. That is, the packaging may optionally obscure part or all of the identifying characteristics of the play incentive contained within. Such packaging may be of fixed form, such as a box, a ball, or an egg, or unformed, such as a gift sack or paper wrapping.

As suggested above, the incentive dispenser 150 draws the play incentive from the incentive supply storage 160 and delivers it to the player. In an embodiment in which solid or packaged play incentives are stored in a transparent incentive supply storage 160, the play incentive may visibly drop from the incentive supply storage directly to the player or to an incentive output tray 170 from which the player may remove it. In one optional embodiment, the incentive output tray 170 may simulate the coin drop tray of older-style gaming machines. As noted above, in yet another alternate embodiment, a beverage may be dispensed from a reservoir attached to the machine to a cup or other container held at the incentive output tray 170. Where multiple gaming machines are connected to a single incentive supply storage 160, delivery to such incentive dispenser may be through communications channels 1010 connecting such incentive supply storage 160 to each incentive dispenser 150.

In one optional embodiment, the underlying game of chance generates outcomes, some of which result in the awarding of a prize award, such as game credits or money. In one optional embodiment of such an invention, the play incentive is issued independent of any prize award to the player. Thus, an incentive qualifying event may result in the issuance of just a play incentive or a play incentive and a prize award. In another optional embodiment, the incentive qualifying event occurs simultaneous with a prize award winning outcome. In a further optional embodiment, the dispensing of the play incentive is intertwined with the awarding of the prize award. This could take many different forms. For example, in one optional embodiment, upon the occurrence of an incentive qualifying event 820, the player may input 900 a selection though an input device 110. A play incentive is selected 910 based on the player input. The selection is associated 920 with a prize award, as described in greater detail below, and the selected play incentive and associated prize award are issued 930 to the player.

Figure 2:
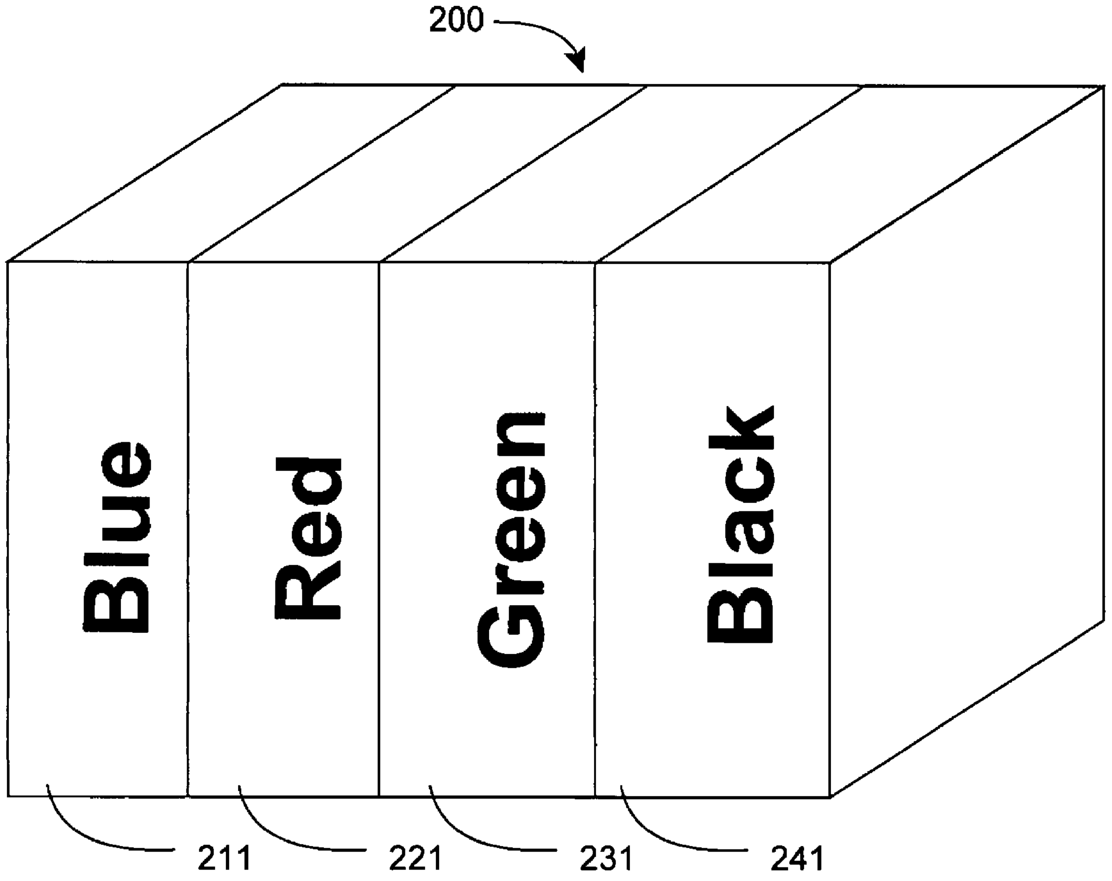
FIG. 2 is an elevated perspective view of an incentive supply storage according to an embodiment of the present invention.

Thus, referring to FIG. 2, in one optional embodiment the incentive supply storage 160 is a container, having one or more chambers, at the gaming machine. In the optional embodiment illustrated, the incentive supply storage 160 is a container 200 having four separate chambers 211, 221, 231, 241, in which play incentives, such as jelly beans, gumballs, popcorn, or the like, are stored. Optionally, each chamber 211, 221, 231, 241 contains play incentives of different characteristics such as color, flavor, or the like. In this example, incentive qualifying events are tied to the game of chance in that the occurrence of an incentive qualifying event triggers a display at the display device 130 in which a player may be asked to select one of the four colors stored in the four chambers 211, 221, 231, 241, here Blue, Red, Green, or Black, representing the choice of jelly beans of different flavors, for example. In the optional embodiment illustrated, such choice is indicated through an input device 110, such as buttons 210, 220, 230, 240 on a touch screen.

In one optional embodiment, the choice input by the player determines the player's prize award in the game of chance. For example, in which an optional embodiment, the data processor 100 has associated or randomly assigns a prize award with each chamber 211, 221, 231, 241 that may be selected. When the player makes his selection, the incentive dispenser 150 dispenses play incentive from the selected chamber 211, 221, 231, 241 and the data processor 100 awards a prize award 212 to the player associated therewith.

In another optional embodiment, the prize award to be awarded by the gaming machine may be determined by the data processor 100. Thus, when the player inputs the player's choice, the incentive dispenser 150 dispenses a play incentive from the selected chamber 211, 221, 231, 241 and the data processor 100 awards a determined prize award 212 to the player. In such an optional embodiment, the player may be made to think that his or her selection of play incentive determined the prize award 212, even if it did not in this particular optional embodiment. It is noted that the prize award 212 awarded to the player may be predetermined by the data processor 100 before the player inputs his or her selection, or may be determined after the player inputs his or her selection. The predetermination or determination of the prize award 212 may be random, quasi-random, or based on one or more factors, such as game play, wager level and denomination, or any other factor.

In any event, the prize award 212 may be displayed to the player upon the display device 130. In an optional embodiment, the prize awards 222, 232, 242 associated with the unselected options may also be displayed. In one optional embodiment, the award 212 is added to the player's stored credits. Additionally or alternatively, the player may have the option to receive the prize award 212 via the prize output device 120 in the form of voucher, scrip, currency, coin, or the like.

Figure 3:
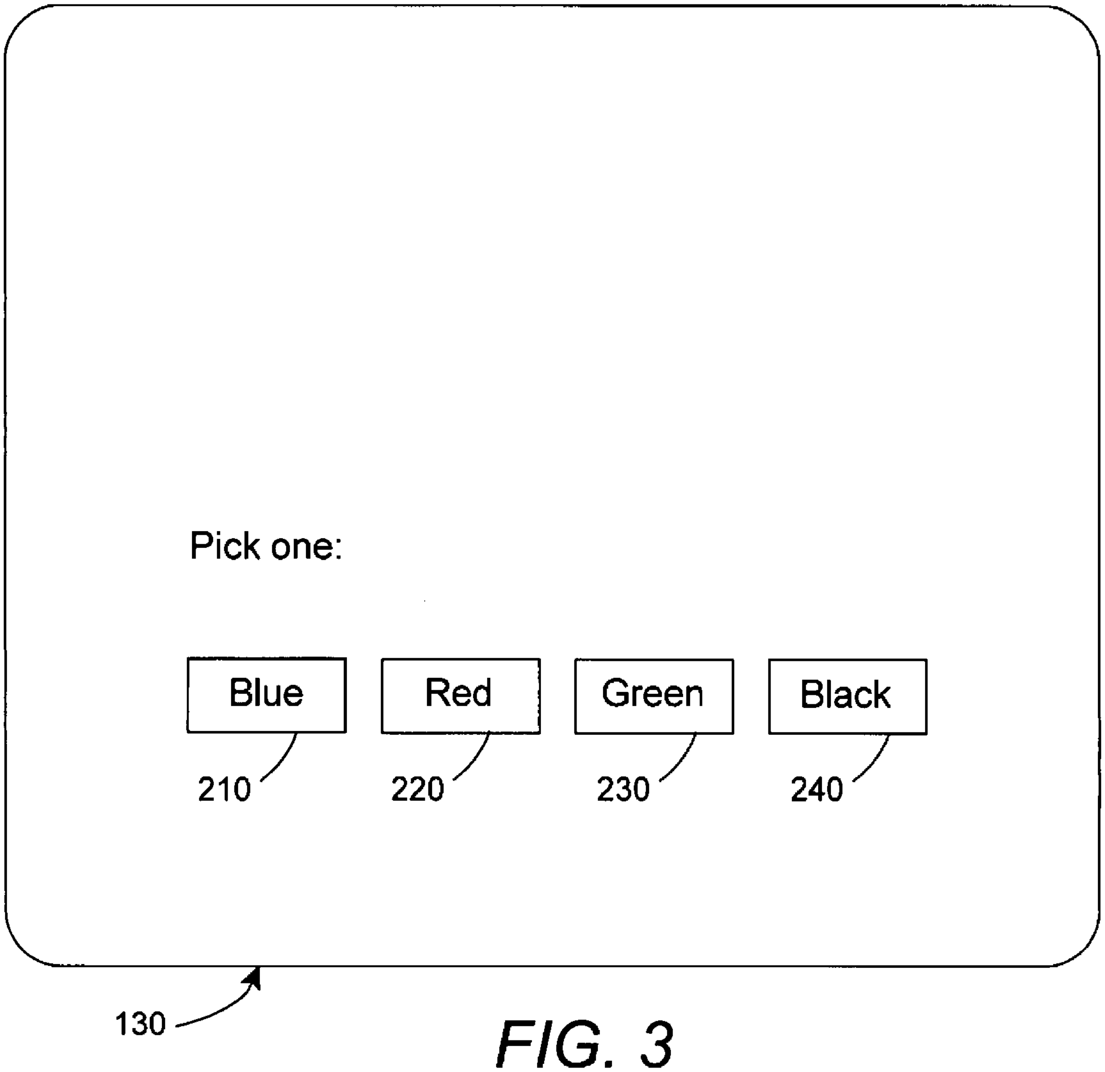
FIG. 3 is a front view of a display during an optional selection step according to an embodiment of the present invention.
Figure 4:
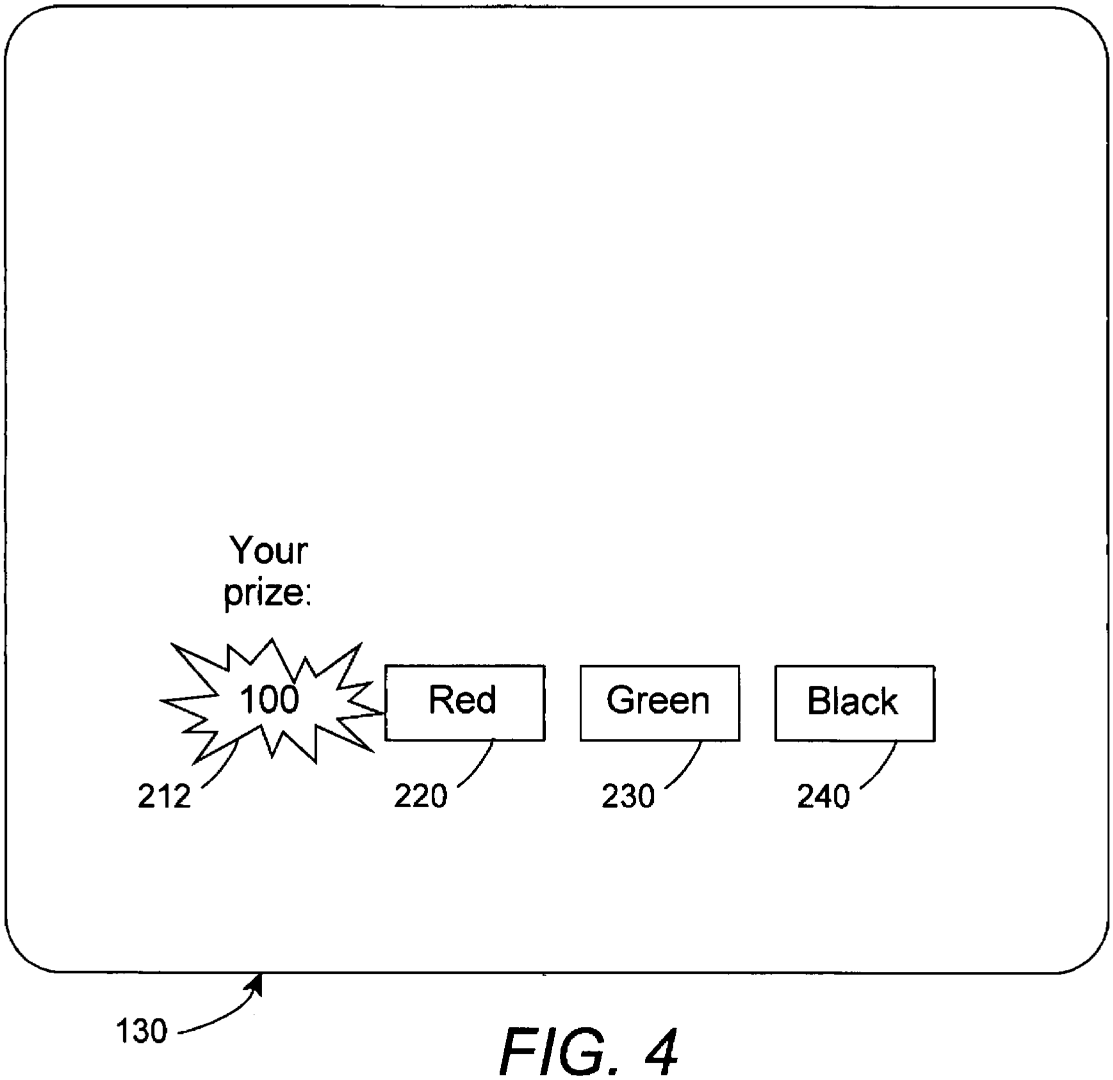
FIG. 4 is a front view of a display during an optional selection step according to FIG. 3.
Figure 5:
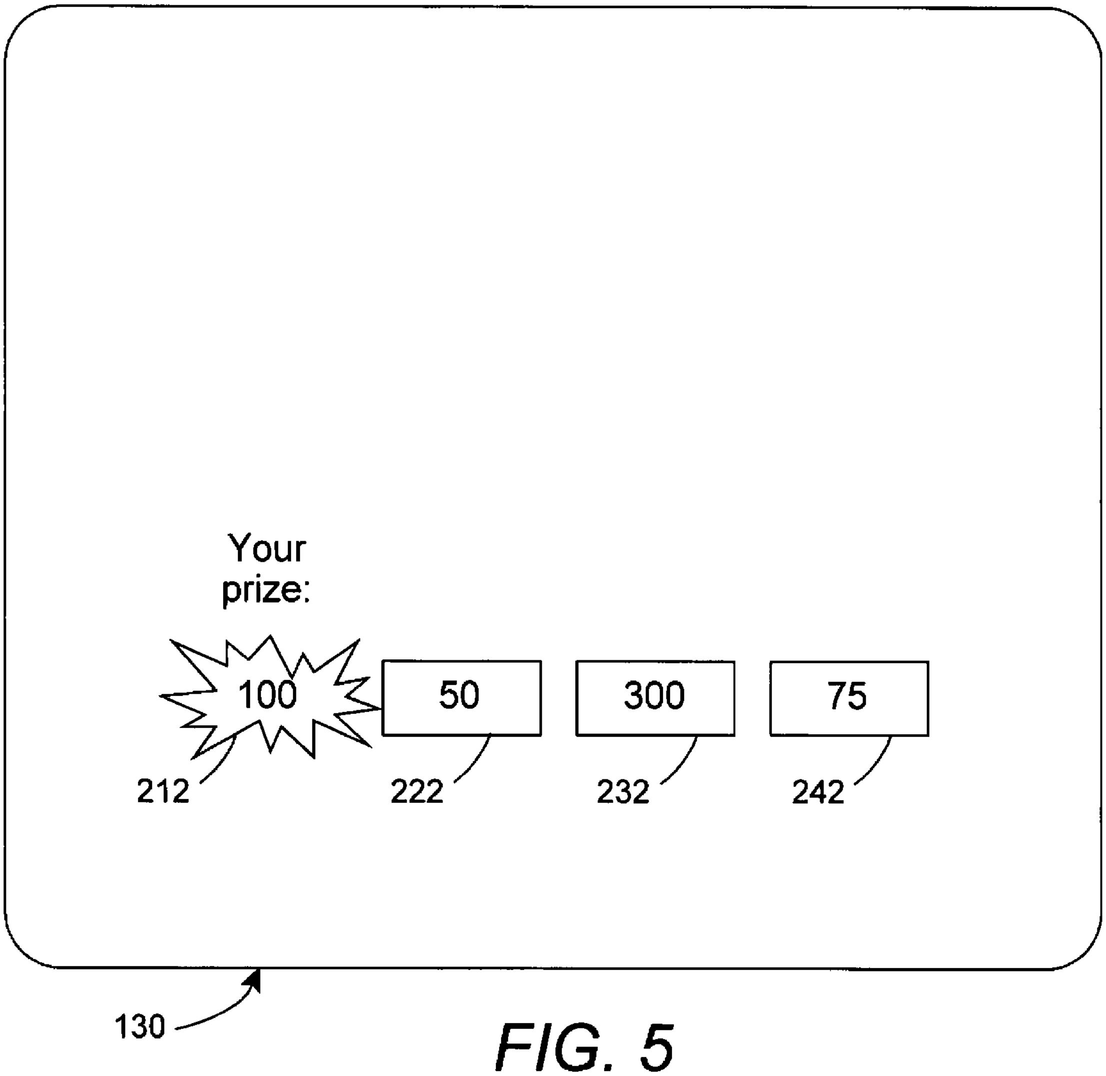
FIG. 5 is a front view of a display during an optional selection step according to FIG. 3.
Figure 6:
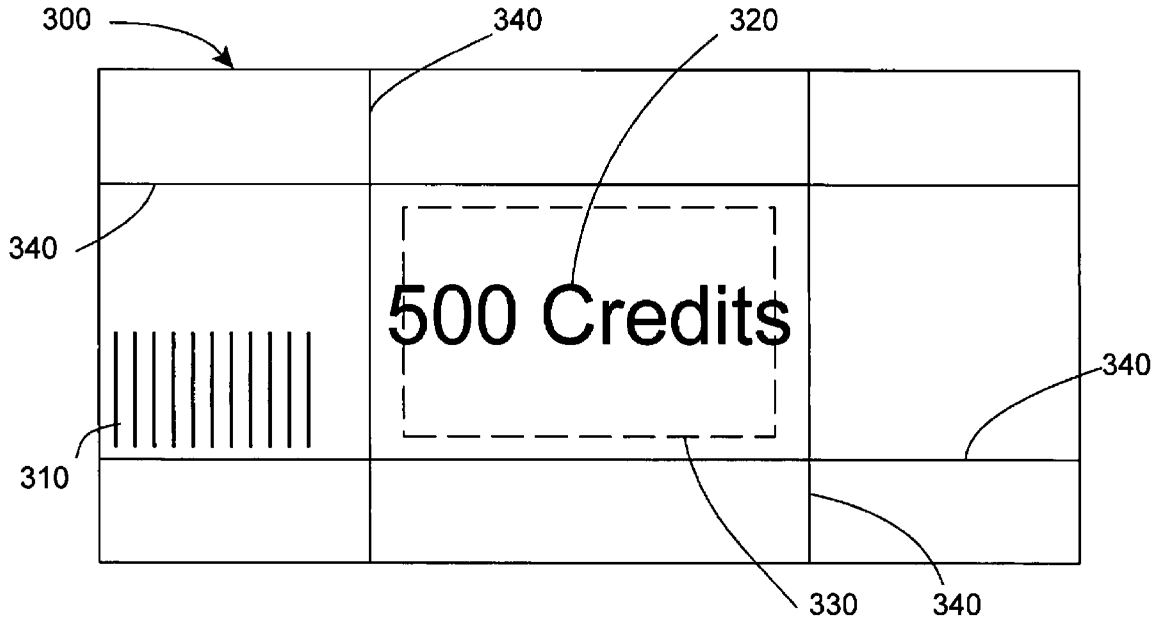
FIG. 6 is a top view of a play incentive wrapper and voucher according to an embodiment of the present invention.
Figure 7:
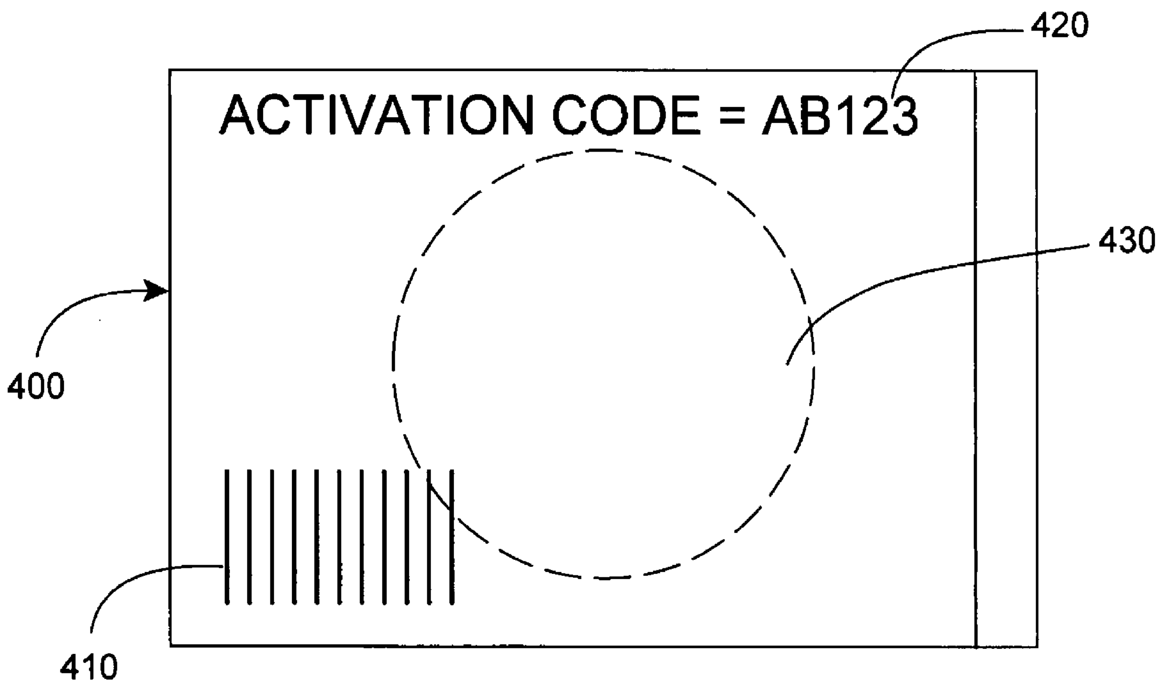
FIG. 7 is a top view of a play incentive package and voucher according to an embodiment of the present invention.

In an alternate optional embodiment, illustrated in FIG. 3, the play incentive may include an indicator of a prize award. For example, a prize award may be printed on the play incentive, or may be represented by the particular play incentive dispensed. Thus, in one optional embodiment, the play incentive 330 is a chocolate bar. The wrapper of the chocolate bar may be simply printed with the prize award. In a further optional embodiment, the wrapper is a voucher 300 representing the prize award 320. That is, in such an optional embodiment, the voucher 300 indicates the prize award in printed form 320 as well as machine readable form 310. The voucher 300 serves as a wrapping for the play incentive when closed. For example, in one optional embodiment, the voucher 300 wraps a play incentive 330 in the form of a chocolate bar when folded along fold lines 340. However, when unfolded, the voucher 300 may be used for credits in the gaming machine by inserting the voucher 300 into the wager acceptor 140 of the gaming machine awarding the play incentive or, in an optional embodiment, any other gaming machine having a wager acceptor. In an alternate optional embodiment, shown in FIG. 4, the play incentive 430 may be dispensed in a presealed package 400 such that the presealed package 400 displays a voucher code 410 or an activation code 420, which may be input by the player through the input device 110 for receipt of the prize amount awarded as determined by the data processor 100.

In optional embodiments that include play incentives of non-nominal value, the selection of play incentive to be awarded may be independent of the gaming machine at which such play incentive is to be awarded. Such selection may optionally be at least partially randomly determined, or may be determined by a processor within the incentive supply storage 160. In such cases, the payback percentage of the gaming machine, including the nominal value and non-nominal value of the play incentives, is greater than the base payback percentage of the game of chance.

Figure 11:
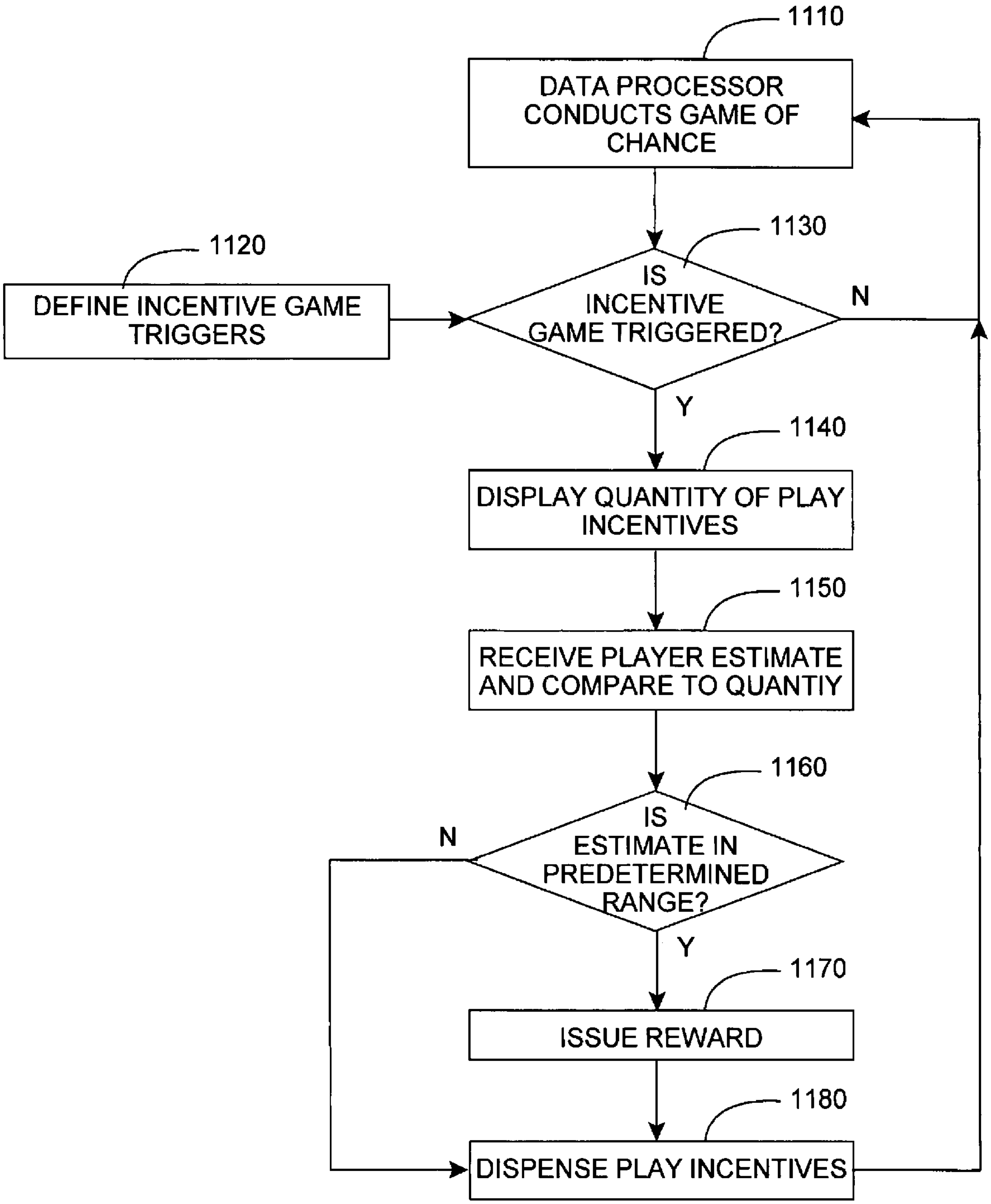
FIG. 11 is a flowchart of a method according to an embodiment of the present invention.
Figure 12:
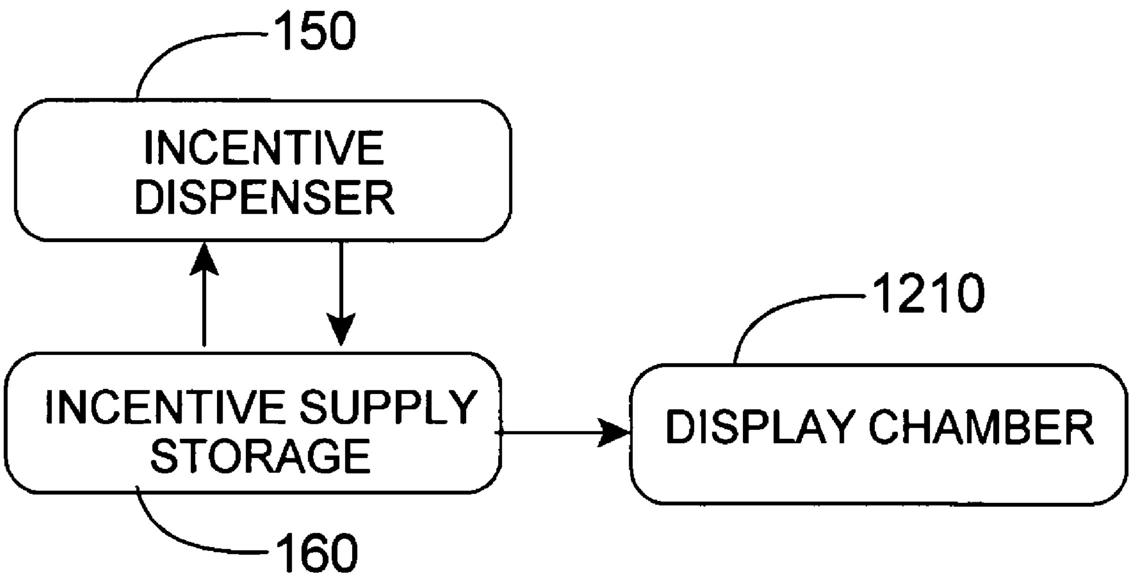
FIG. 12 is a block diagram of a gaming machine according to an optional embodiment of the present invention.

With reference to FIGS. 11 and 12, in an optional embodiment, the play incentives may be used in the gaming method. For example, in an optional embodiment, a game of chance is conducted 1110. Before, during, or after (depending on the optional embodiment) an incentive game may be triggered 1130. More particularly, incentive game triggers are defined 1120. The incentive game triggers may be dependent on, or independent of, the game of chance, i.e. the incentive game may be triggered upon an occurrence in the game of chance or may be triggered randomly. In the incentive game, the player may attempt to obtain a winning outcome. Optionally, the player is issued play incentives without regard to whether incentive game is triggered 1120 or the outcome of the game of chance.

In an optional embodiment, when an incentive game is triggered 1130, a quantity of play incentives is displayed 1140 to the player. In an optional embodiment, the play incentives in an incentive supply storage 160 may be displayed to the player. In another optional embodiment, an incentive supply storage 160 may communicate with a display chamber 1210. A quantity of play incentives may be transferred from the incentive supply storage 160 to the display chamber 1210. In any case, the quantity of play incentives displayed 1140 to the player is tracked or counted. For example, a mechanical or optical counter may count the quantity of play incentives stored in the incentive supply storage 160 or transferred to the display chamber 1210, as the case may be.

The gaming machine receives 1150 input from the player representing the player's estimate of the quantity of play incentives displayed to the player. The input may be received in any fashion. For example, the player may use a touch screen, keyboard, key pad, mouse, pointer, or the like to select or type a number representing the player's estimate. In an optional embodiment, the player may have a limited time period to enter the player's estimate. In such an optional embodiment, the game may terminate after the limited time expires or, alternatively, an estimate may be entered by the gaming machine on the player's behalf after the limited time expires.

If the estimate is within 1160 a predetermined range of the quantity of play incentives displayed, the player may be issued 1170 a reward. The predetermined range may be of any size. For example, the predetermined range may require the player's estimate to exactly match the quantity of play incentives displayed. In another optional embodiment, the player may be rewarded even if his or her estimate varied from the quantity of play incentives. In yet another optional embodiment, different rewards may be issued depending on the variance of the player's estimate from the quantity of play incentives displayed. For example, a first reward may be issued for an exact match of the estimate to the quantity of play incentives displayed, whereas a second reward (optionally smaller than the first reward) may be issued for an estimate that varies by a predefined amount from the quantity of play incentives displayed.

In an optional embodiment, the player may receive 1180 a quantity of play incentives without regard to whether the player's estimate is within the predetermined range to qualify for a reward. That is, in an optional embodiment, play incentives may be dispensed through an incentive dispenser 150 as described above regardless of the outcome of the incentive game, with the player additionally receiving a reward for inputting an estimate within a predetermined range of the quantity of play incentives displayed in the incentive game. Optionally, the play incentives may be delivered from the display chamber 1210 or directly from the incentive supply storage 160 (as shown in FIG. 12) to the incentive dispenser 150.

While certain embodiments of the present invention have been shown and described it is to be understood that the present invention is subject to many modifications and changes without departing from the spirit and scope of the claims presented herein.

I claim:

1. A method for dispensing play incentives to a player of at least one gaming machine having a data processor conducting a game of chance, said method comprising:

storing said play incentives in an incentive supply storage associated with said gaming machine for delivery to a player at said gaming machine, at least a portion of said play incentives having substantially nominal value;

defining at least one incentive game trigger;

providing at each of said at least one gaming machine an incentive dispenser delivering play incentives from said incentive supply storage, said incentive dispenser in communication with said gaming machine;

said data processor conducting said game of chance for said player;

said gaming machine determining whether said incentive game trigger has been triggered; and when said incentive game trigger has been triggered, conducting an incentive game comprising:

said gaming machine cooperating with said incentive dispenser to display a quantity of said play incentives;

receiving input from said player representing the player's estimate of the quantity of play incentives displayed;

comparing said input from said player to the quantity of play incentives displayed;

dispensing at least a portion of said play incentives to a player at said gaming machine; and if said input from said player is within a predetermined range of said quantity of play incentives displayed, issuing a prize award to said player.

2. The method of claim 1 wherein said game of chance produces an outcome and said incentive game trigger is based upon said outcome of said game of chance.

3. The method of claim 2 wherein said outcome is associated with a prize award.

4. The method of claim 1 wherein said game of chance produces an outcome and said incentive game trigger is independent of said outcome of said game of chance.

5. The method of claim 1 further comprising said incentive dispenser selecting a play incentive from said incentive supply storage.

6. The method of claim 1 further comprising providing a plurality of gaming machines each having an incentive dispenser delivering play incentives from a common incentive supply storage.

7. A method for dispensing play incentives to a player of at least one gaming machine having a data processor conducting a game of chance, said method comprising:

storing said play incentives in an incentive supply storage associated with said gaming machine for delivery to a player at said gaming machine, at least a portion of said play incentives having substantially nominal value;

defining at least one incentive game trigger;

providing at each of said at least one gaming machine an incentive dispenser delivering play incentives from said incentive supply storage, said incentive dispenser in communication with said gaming machine;

said data processor conducting said game of chance for said player;

said gaming machine determining whether said incentive game trigger has been triggered; and when said incentive game trigger has been triggered, conducting an incentive game comprising:

said gaming machine cooperating with said incentive dispenser to display a quantity of said play incentives at an incentive display;

receiving input from said player representing the player's estimate of the quantity of play incentives displayed;

comparing said input from said player to the quantity of play incentives displayed;

dispensing at least a portion of said play incentives to a player at said gaming machine; and if said input from said player is within a predetermined range of said quantity of play incentives displayed, issuing a prize award to said player.

8. The method of claim 7 wherein said game of chance produces an outcome and said incentive game trigger is based upon said outcome of said game of chance.

9. The method of claim 8 wherein said outcome is associated with a prize award.

10. The method of claim 7 wherein said game of chance produces an outcome and said incentive game trigger is independent of said outcome of said game of chance.

11. The method of claim 7 further comprising said incentive dispenser selecting a play incentive from said incentive supply storage.

12. The method of claim 7 further comprising providing a plurality of gaming machines each having an incentive dispenser delivering play incentives from a common incentive supply storage.

13. A device for dispensing play incentives to players of at least one gaming machine, said device comprising:

at least one gaming machine comprising:

a data processor in communication with a data structure, said data structure adapted to store a game of chance and at least one incentive game trigger, said data processor adapted to conduct said game of chance for said player and determine whether said incentive game trigger has been triggered; and an input device in communication with said data processor, said input device adapted to receive input from said player representing an estimate of play incentives displayed to said player when said incentive game trigger has been triggered;

an incentive supply storage associated with said gaming machine, said incentive supply storage adapted to store said play incentives for delivery to a player at said gaming machine, at least a portion of said play incentives having substantially nominal value;

an incentive dispenser in communication with said incentive supply storage, said incentive dispenser adapted to deliver play incentives from said incentive supply storage; and a display chamber associated with said gaming machine in communication with said incentive supply storage, said display chamber adapted to receive a quantity of play incentives from said incentive supply storage for display to said player in response to said incentive game trigger.

* * * * *